(12) United States Patent
Zwicky et al.

(10) Patent No.: US 8,629,367 B2
(45) Date of Patent: Jan. 14, 2014

(54) PLUG-IN PRIMARY POWER CONNECTIONS OF TWO MODULES OF A GAS-INSULATED HIGH-VOLTAGE SWITCHGEAR ASSEMBLY

(75) Inventors: Daniel Zwicky, Niederrohrdorf (CH); David Saxl, Zürich (CH); Horst Schalber, Schöneck (DE); Michael Mann, Alzenau (DE); Daniel Kuhl, Frankfurt (DE)

(73) Assignee: ABB Technology AG, Zurich (CH)

( * ) Notice: Subject to any disclaimer, the term of this patent is extended or adjusted under 35 U.S.C. 154(b) by 15 days.

(21) Appl. No.: 13/296,835

(22) Filed: Nov. 15, 2011

(65) Prior Publication Data

US 2012/0138573 A1      Jun. 7, 2012

Related U.S. Application Data

(63) Continuation of application No. PCT/EP2010/056610, filed on May 12, 2010.

(30) Foreign Application Priority Data

May 20, 2009 (DE) .......................... 10 2009 022 105
May 20, 2009 (DE) .......................... 10 2009 022 127
Sep. 23, 2009 (DE) .......................... 10 2009 042 644
Jan. 18, 2010 (EP) .................................... 10000428

(51) Int. Cl.
*H02B 1/20*      (2006.01)
*H02B 13/00*    (2006.01)

(52) U.S. Cl.
USPC ............................................. 218/68; 218/75

(58) Field of Classification Search
USPC ............. 218/9, 13, 44, 47, 58, 68, 69, 71, 75, 218/76, 152–154; 200/48 R
See application file for complete search history.

(56) References Cited

U.S. PATENT DOCUMENTS 4,816,624 A  *  3/1989  Perrissin et al. ................. 218/71
2005/0190032 A1*  9/2005  Vrana et al. .................... 336/90

FOREIGN PATENT DOCUMENTS

DE       40 01 192 A1    7/1991
DE       43 12 261 A1    10/1994
(Continued)

OTHER PUBLICATIONS

Translation of EP 999624 A1 Erwin Reichl May 10, 200, pp. 1-5.*

(Continued)

*Primary Examiner* — Amy Cohen Johnson
*Assistant Examiner* — Marina Fishman
(74) *Attorney, Agent, or Firm* — Buchanan Ingersoll & Rooney PC

(57) ABSTRACT

A gas-insulated switchgear assembly having a first module and a second module, which each have a gas area, which is in the form of a pressure vessel, is filled with an insulating gas and has at least two phase conductors. The first module is connected to the second module such that the first gas area and the second gas area are hydraulically separated from one another by an insulating body, while the phase conductors in the first module are electrically connected to the phase conductors at the same electrical potential in the second module. The at least two phase conductors in the first module can be electrically connected to the at least two phase conductors at the same electrical potential in the second module, in each case via a detachable plug connection.

15 Claims, 8 Drawing Sheets

(56) References Cited

FOREIGN PATENT DOCUMENTS

| | | | |
|---|---|---|---|
| DE | 43 12 617 A1 | 10/1994 | |
| DE | 4312261 A1 * | 10/1994 | |
| DE | 44 45 082 C1 | 5/1996 | |
| DE | 196 15 553 A1 | 10/1997 | |
| DE | 101 19 333 C1 | 5/2002 | |
| DE | 101 19 183 C1 | 8/2002 | |
| DE | 101 39 251 C1 | 11/2002 | |
| DE | 10139251 C1 * | 11/2002 | |
| EP | 0 199 249 A1 | 10/1986 | |
| EP | 0 437 762 A1 | 7/1991 | |
| EP | 0 999 624 A1 | 5/2000 | |
| EP | 999624 A1 * | 5/2000 | |
| FR | 2 854 001 A1 | 10/2004 | |

OTHER PUBLICATIONS

International Search Report (PCT/ISA/210) issued on Aug. 25, 2010, by European Patent Office as the International Searching Authority for International Application No. PCT/EP2010/056610.
Search Report issued on Aug. 16, 2010, by European Patent Office for Application No. 10000428.

* cited by examiner

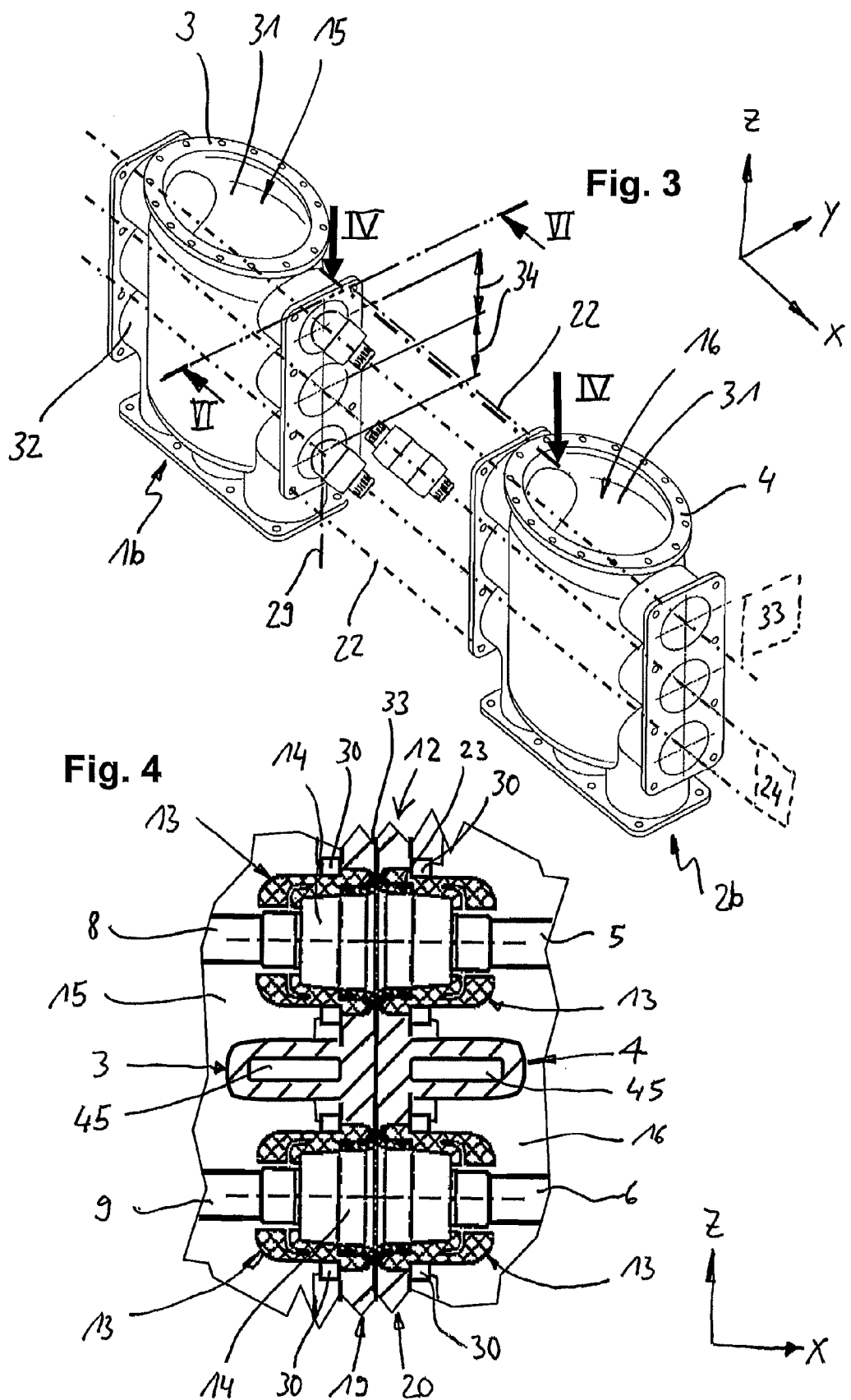

Fig. 7
Fig. 8
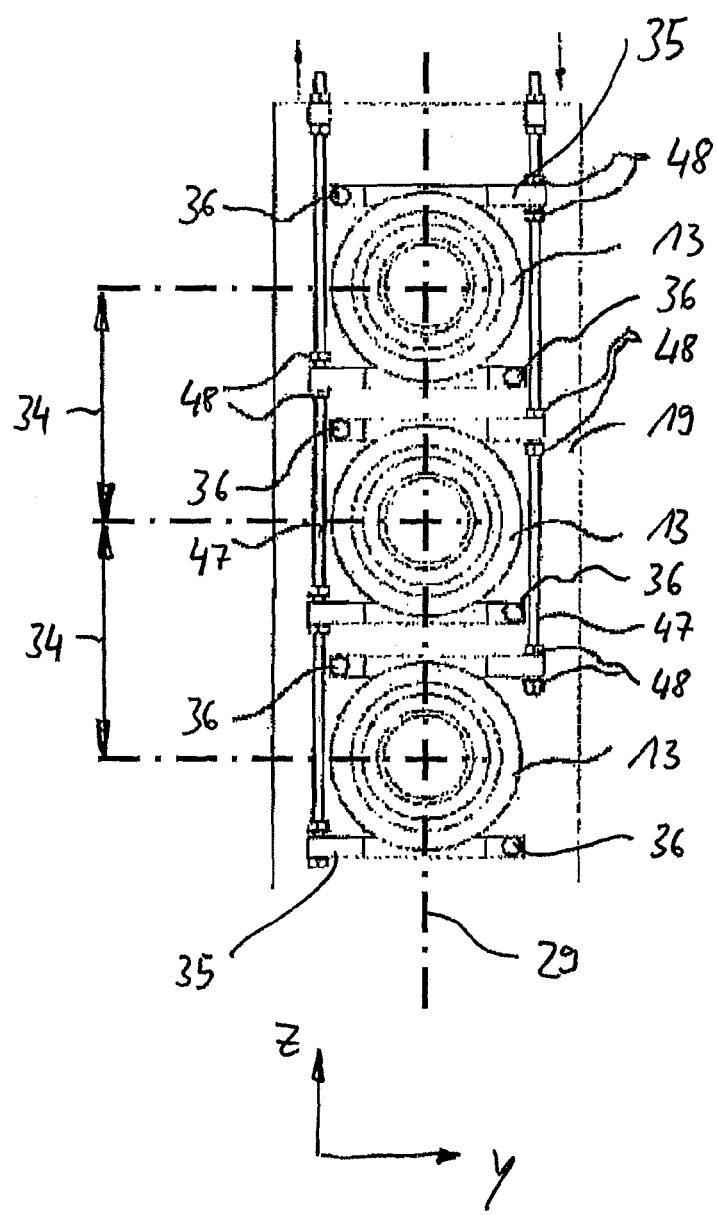
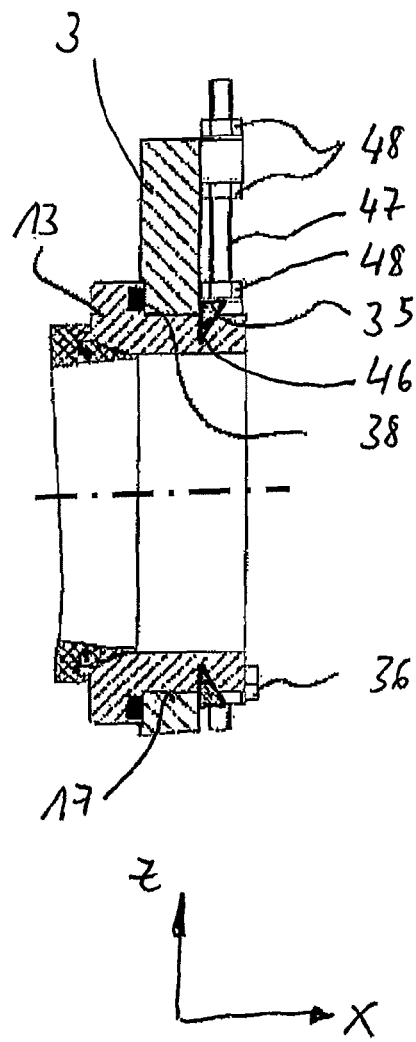

Fig. 9
Fig. 10
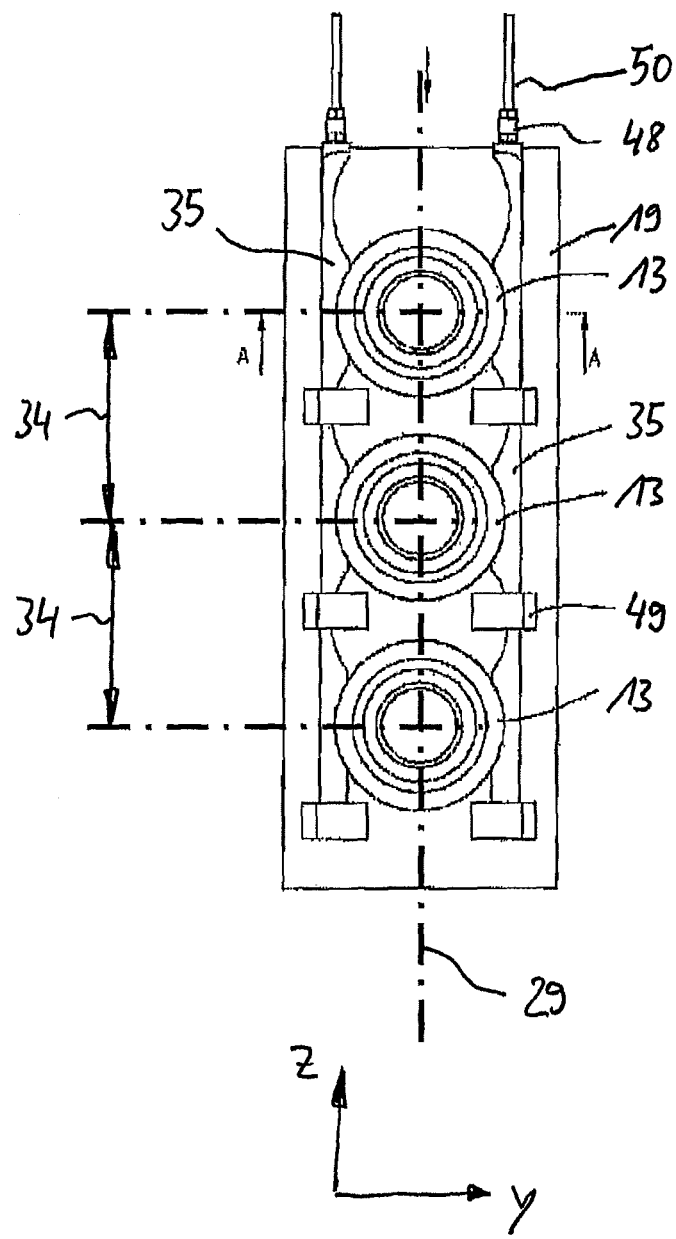
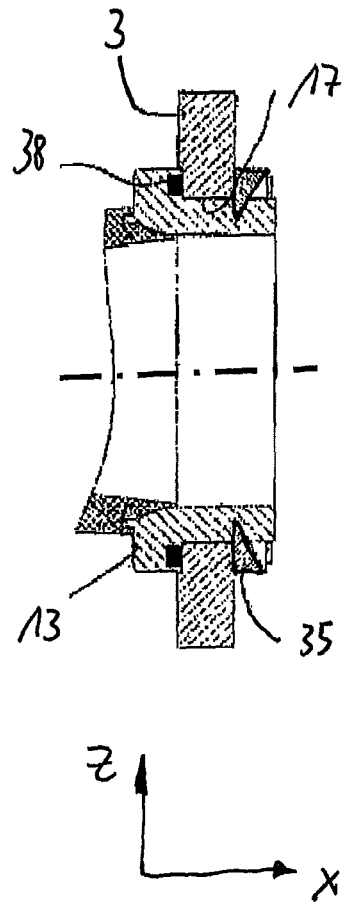

PLUG-IN PRIMARY POWER CONNECTIONS OF TWO MODULES OF A GAS-INSULATED HIGH-VOLTAGE SWITCHGEAR ASSEMBLY

RELATED APPLICATION(S)

This application claims priority as a continuation application under 35 U.S.C. §120 to PCT/EP2010/056610, which was filed as an International Application on May 12, 2010 designating the U.S., and which claims priority to German Application 10 2009 022 105.0 filed in Germany on May 20, 2009, and German Application 10 2009 022 127.1 filed in Germany on May 20, 2009 and German Application 10 2009 042 644.2 filed in Germany on Sep. 23, 2009 and European Application No. 10000428.2 filed in Europe on Jan. 18, 2010. The entire contents of these applications are hereby incorporated by reference in their entireties.

FIELD

The present disclosure relates to a switchgear assembly, such as, plug-in primary power connections of two modules of a gas-insulated high-voltage switchgear (GIS) assembly, and to an electrical connection between two primary conductors of two GIS modules which are coupled to one another and whose primary conductors for each phase are at the same electrical potential.

BACKGROUND INFORMATION

In a first known type of gas-insulated high-voltage switchgear assemblies, the primary power connections of two mutually adjacent GIS modules are connected to one another via a screw connection in a flange area of each housing of the GIS modules. The housing flanges are pressed against one another, and a seal arranged between them is compressed such that an interface between the two housings of the GIS modules is sealed in a gas-tight manner. The assembly and dismantling of such GIS modules can be relatively labour-intensive.

In a second known type of high-voltage switchgear assemblies, specific connecting modules, such as a voltage sensor, are encapsulated in a solid insulator, and can be connected to a primary conductor of a GIS module via a plug contact. The solid insulator contributes considerably to the total mass of the connecting module. By way of example, one representative of a type such as this is disclosed in DE 4445082 C1.

In a third known type of gas-insulated high-voltage switchgear assemblies, the electrical connection of the primary conductors of two GIS modules is made via a dry plug contact connection. One representative of a type such as this, for example, is disclosed in DE 4312617 A1. Such dry plug contact connections can be used only for relatively low gas pressures, which are not much above atmospheric pressure.

Because of the increasing demand for smaller but nevertheless high-power GIS for high-voltage installations, the compactness of a GIS is becoming increasingly important.

When, for example, relatively high electrical powers are specified from a GIS, with the protective gas, the functional design and the materials remaining the same, this generally has a negative effect on the dimensions of the GIS, since the GIS can be implemented in a less compact form, because of the increased housing diameter.

SUMMARY

An exemplary gas-insulated high-voltage switchgear assembly is disclosed, comprising: a first module and a second module, wherein the modules each have a gas area, which is in the form of a pressure vessel and has at least two phase conductors, wherein the gas area is in each case filled with an insulating gas such that the at least two phase conductors are arranged in an electrically isolated manner in the respective module, wherein the first module is connected to the second module such that the first gas area and the second gas area are hydraulically isolated from one another, wherein the phase conductors in the first module are electrically connected during operation of the high-voltage switchgear assembly to the phase conductors at the same electrical potential in the second module, wherein the two gas areas each have a housing-side connecting opening for each phase conductor, which connecting opening surrounds the respective phase conductor and opens into a flange-like adapter section, wherein the flange-like adapter section of the first module can be mechanically detachably connected to the flange-like adapter section of the second module, wherein each of the at least two phase conductors in the first module can be electrically connected to the corresponding phase conductor at the same electrical potential in the second module, in each case via a detachable plug connection, and wherein each plug connection has an insulating body, and in that the two gas areas are separated from one another by these insulating bodies.

An exemplary gas-insulated high-voltage switchgear assembly is disclosed, comprising: a first module having a first gas area filled with an insulating gas and at least two phase conductors electrically isolated through the insulating gas in the first gas area; and a second module having a second gas area filled with insulating gas area and at least two phase conductors electrically isolated through the insulating gas in the second gas area, wherein the first module is connected to the second module such that the first gas area and the second gas area are hydraulically isolated from one another, wherein the phase conductors in the first module are electrically connected during operation of the high-voltage switchgear assembly to the phase conductors at the same electrical potential in the second module, wherein the first and second gas areas each have a housing-side connecting opening for each phase conductor, which connecting opening surrounds the respective phase conductor and opens into a flange-like adapter section, wherein the flange-like adapter section of the first module can be mechanically detachably connected to the flange-like adapter section of the second module, wherein each of the at least two phase conductors in the first module can be electrically connected to the corresponding phase conductor at the same electrical potential in the second module, in each case via a detachable plug connection, and wherein each plug connection has an insulating body, and the first and second gas areas are separated from one another by these insulating bodies.

BRIEF DESCRIPTION OF THE DRAWINGS

Exemplary embodiments of the disclosure are illustrated, purely schematically, in the drawing, in which:

FIG. 3 shows a three-dimensional view of a third two three-phase-encapsulated HV GIS modules in the uncoupled state in accordance with an exemplary embodiment of the present disclosure;

FIG. 4 shows a broken-open longitudinal cross section of a first variant of the plug connection, in the coupled state, along the section plane IV-IV in FIG. 3 in accordance with an exemplary embodiment of the present disclosure;

FIG. 7 shows a broken-open longitudinal cross section of a third variant of the plug connection, in the coupled state, along the section plane IV-IV in FIG. 3 in accordance with an exemplary embodiment of the present disclosure;

FIG. 8 shows a view of the flange-like adapter section, as shown in FIG. 7, of the first module in the direction X, corresponding to the arrows VI-VI in accordance with an exemplary embodiment of the present disclosure;

FIG. 9 shows a broken-open longitudinal cross section of a fourth variant of the plug connection, in the coupled state, along the section plane IV-IV in FIG. 3 in accordance with an exemplary embodiment of the present disclosure;

FIG. 10 shows a view of the flange-like adapter section, as shown in FIG. 9, of the first module in the direction X, corresponding to the arrows VI-VI in accordance with an exemplary embodiment of the present disclosure;

DETAILED DESCRIPTION

Figure 1:
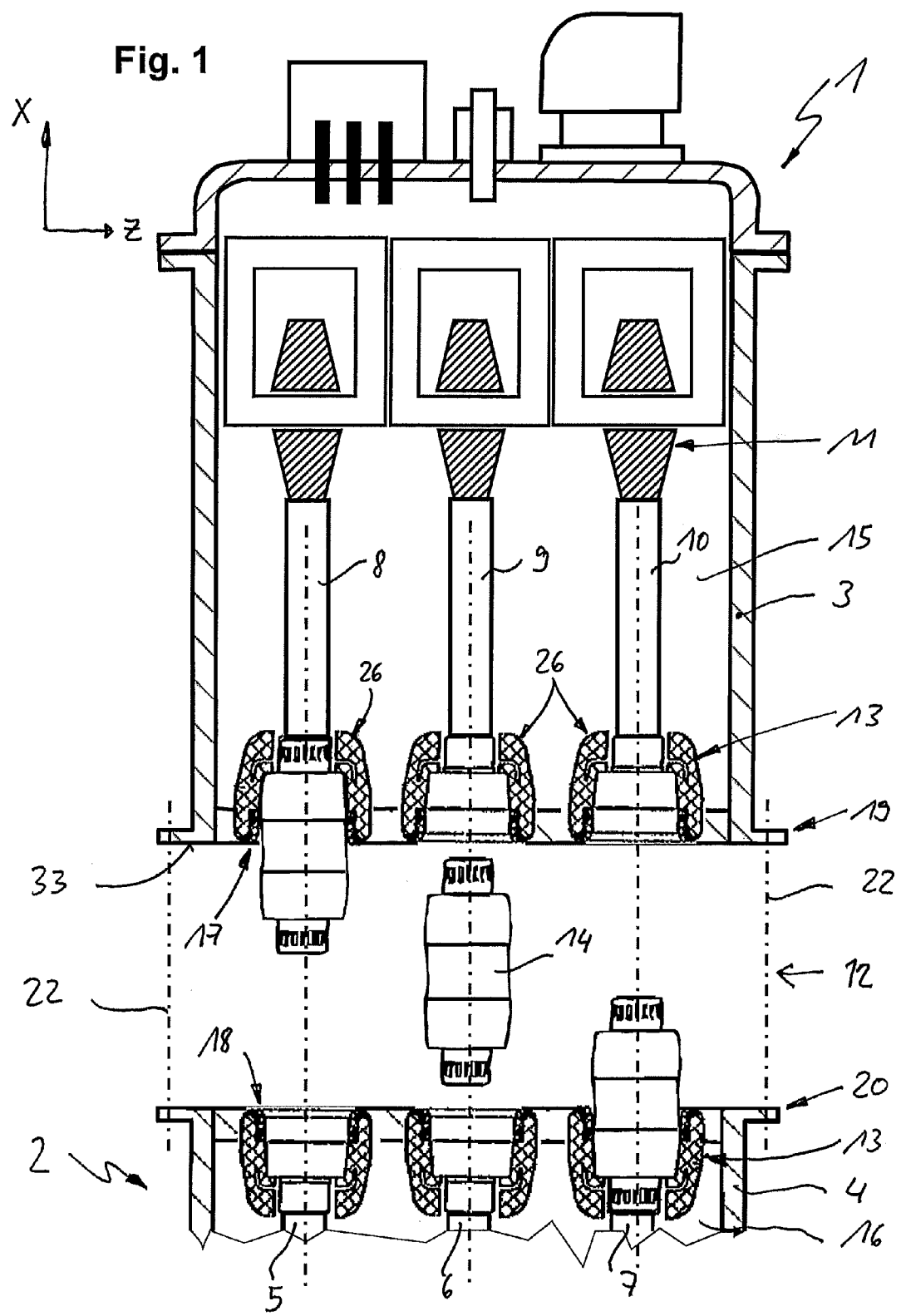
FIG. 1 shows a longitudinal section through a first two three-phase-encapsulated HV-GIS modules in the uncoupled state in accordance with an exemplary embodiment of the present disclosure.

Exemplary embodiments of the present disclosure are directed to providing a gas-insulated high-voltage switchgear assembly with an improved connection of two adjacent GIS modules.

In an exemplary embodiment of the present disclosure, the gas-insulated high-voltage switchgear assembly has a first module and a second module, wherein these modules each have a gas area, which is in the form of a pressure vessel and has at least two phase conductors. The gas area is filled with an insulating gas such that the at least two phase conductors are arranged in an electrically isolated manner in the respective module. The first module is connected to the second module such that the first gas area and the second gas area are hydraulically separated from one another by an insulating body, and such that the phase conductors in the first module are electrically connected to the phase conductors at the same electrical potential in the second module. The two gas areas each have a housing-side connecting opening for each phase conductor, which connecting opening surrounds the respective phase conductor and opens into a flange-like adapter section. In each case, one housing-side connecting opening is used to separately hold a single primary phase connection. The term "single-phase insulator" means an electrical insulator through which only one nominal conductor (one primary phase) is passed. Furthermore, the flange-like adapter section of the first module is mechanically detachably connected to the flange-like adapter section of the first module. The at least two phase conductors in the first module are electrically connected to the at least two phase conductors at the same electrical potential in the second module, in each case via a detachable plug connection. In this case, the two gas areas are separated from one another by the insulating body of the plug connections. The plug connection is in this case formed from at least two parts and, in a basic version, includes a female element and a contact pin which can be connected to it.

In other words, the first module and the second module each have a housing-side connecting opening for each phase conductor, in order to separately hold in each case one phase conductor (nominal conductor of an electrical potential) of the switchgear assembly. The term "separately holding" means that the phase conductor is passed through a single-phase insulator at the interface, that is to say the detachable plug connection. The term "single-phase" insulator means an electrical insulator through which only one nominal conductor is passed.

When, in the case of a three-phase switchgear assembly, the connecting openings are arranged over an area on a common opening plane, the interface can be used particularly advantageously and in a particularly versatile form with the detachable plug connections.

Before the plug connections are fitted, the connecting openings of each module each form a separate access to the respective gas area from outside the respective housing.

In comparison with the known electrical connections between two primary conductors of two GIS modules which are coupled to one another, an exemplary embodiment of the present disclosure combines advantages of a plug contact connection for power transmission and a screw flange connection for mechanical connection of two adjacent modules in an interface between the modules.

If the flange-like adapter sections of both modules project from a main chamber of the housing such that they are at least partially accessible from the side opposite the contact surface of the two flange-like adapter sections, the two flange-like adapter sections can be pressed together like clasps, for example with a clamping bracket.

In exemplary embodiments of the gas-insulated high-voltage switchgear assembly of the present disclosure, the female and/or male plug contact parts of the detachable plug connection are held in their intended position in the respective connecting opening, before the two modules are fitted to one another from the interior of the main chamber of the gas area, in the flange-like adapter sections with a detachable securing device, for example a clamping ring or securing ring for shafts according to DIN 472 (for example a circlip or the like). An exemplary embodiment such as this is advantageous because it allows two adjacent modules to be coupled without any lateral mounting modules. Depending on the manner in which the female and/or male plug contact parts of the detachable plug connection are held, an exemplary interface configuration as disclosed herein allows a module, for example a switch panel, to be removed without any need to evacuate the insulating gas from the adjacent modules or the adjacent module. The advantages will be illustrated in the following text with reference to an exemplary embodiment, in which module A, which is connected to the adjacent module B, can be removed from a gas-insulated substation. Once the insulating gas has been pumped out of the gas area of the module A—and if necessary nominal conductor sections in the interior of the gas area have been removed or partially removed—the securing ring for shafts according to DIN 472 is released through a service cover on the housing and, for example, the female and male plug contact part of the detachable plug connection is removed via the gas area of the respective module. The removal process is carried out analogously in the situation where the detachable plug connection is formed from two female plug contact parts which are electrically connected to one another via a pin contact.

In exemplary embodiments of the present disclosure, the plug connection is in the form of a dry plug contact coupling. If the plug connection is in the form of a dry plug connection, the high-voltage measurement unit can be connected to the adjacent module (connecting module) without any need for insulating gas manipulation, such as evacuation of the gas volume of the high-voltage measurement unit or of the adjacent module. As a result, this exemplary embodiment allows for economic repair and (re-)commissioning processes. In the context of the present disclosure, the term dry plug connection means an electrically insulating plug connection which allows high-voltage insulation from the surrounding air. During the coupling process, the ductile insulation material displaces the surrounding air from the plug coupling.

If the gas areas of the modules are pressure vessels which are designed for operation at a nominal pressure of at least 2 bar in the respective gas area, it is thus possible to produce GIS high-voltage modules. Exemplary modules such as these have, for example, an SF6 insulating-gas filling, at an exemplary operating pressure of 5 bar, for an application above 50 kV.

If at least two plug connections, at least in the case of the flange-like adapter section, extend horizontally parallel to one another on a first plane, modular couplings which can be used in a versatile form can be produced.

If the flange-like adapter sections are at the same time provided as a location area for temporary storage of a module, for example during assembly, then it is advantageous for at least the flange-like adapter sections of the first module to be arranged on a second plane. The second plane is arranged transversely with respect to the first plane, in particular at right angles to the first plane. The respective centers of the connecting openings therefore lie on a common, first straight line. A further advantage provided by the exemplary embodiment is the further increase in the versatile usefulness of the modules, ensuring optimum modularity.

In an exemplary embodiment of the present disclosure, the adapter sections of at least two connecting openings of the same module are each at least partially integrated in a common adapter section. By way of example, this allows simplified machining of the connecting surfaces after casting of the housing, associated with improved compliance with shape and dimensions.

Depending on a specification for the modules, the adapter sections of at least two connecting openings of the same module are each at least partially integrated in a housing-side wall section of the respective module. By way of example, this measure permits a simplified housing shape, which results in financial advantages.

In another exemplary embodiment of gas-insulated high-voltage modules of the present disclosure, the first module and the second module each have at least three phase conductors. In this case, the at least three plug contacts are arranged at a regular distance from one another, which allows versatile use, for example installation rotated through 180 degrees with respect to the adjacent connecting module (for example the second module).

In exemplary embodiments disclosed herein the plug connection can have at least one plug contact with a first female element and a second female element. During nominal operation of the two adjacent modules, these female elements are electrically connected to one another via a contact element. In this case, the first female element is advantageously attached to the adapter section of the first module, and the second female element is attached to the adapter section of the second module.

In an exemplary alternative embodiment of the present disclosure, each plug connection can have a female coupling part and a male coupling part for each conductor/phase. By way of example, the plug connection therefore has a female element and a contact element which can be or is electrically connected to it, wherein the first female element is attached to the adapter section of the first module, and the contact element is attached to the adapter section of the second module.

An exemplary embodiment of a three-phase-encapsulated first and second module allows coding of the installation position of the first module with the second module, for example when two phases R, Y of the first module have female elements, and a phase B has a pin contact as plug contact connections, while the two corresponding phases R, Y of the second module are in the form of pin contacts, and while the third phase B of the second module is in the form of a female element. A configuration such as this makes it possible to reliably ensure foolproof fitting of the first module to the second module, even when the intention is for personnel with little training to carry out the assembly process.

In an exemplary embodiment of the present disclosure having the flange-like adapter sections, the adapter sections of the first module and the adapter sections of the second module can be or are connected to one another in order to mechanically connect each of the two modules, by means of at least one screw connection.

In an exemplary mechanical connection of the two modules, the adapter sections of the first module and the adapter sections of the second module can each be connected to one another by means of at least one clamping connection. In this case, the at least one clamping connection circumferentially surrounds the adapter sections, at least in places.

Depending on the specifications for the plug contact connection and maintainability, the insulating body has a plurality of parts and, per phase, includes at least one insulation element which is in the form of a cup and an insulation element which, for example, is cylindrical, interacts, forming a seal, with the insulation element which is in the form of a cup and, for example, laterally surrounds, at least in places, a contact element which extends between the female elements, which are likewise in the form of cups. If necessary, the insulation element in the form of a cup is mechanically reinforced in its end facing the flange-like adapter section. In this case, this end of the insulation element in the form of a cup has, for example, reinforcements composed of fibre-reinforced plastic and/or metal. The cylindrical insulation element forms the actual dry plug connection and merges with the insulation element in the form of a cup, and with the geometry surrounding it. In a high-voltage application, the cylindrical insulation element is a high-voltage insulator composed of a ductile insulation material such as silicone. The ductile insulation compound of the insulation element is used to provide electrical insulation from air and, when the plug contact connection is mated, to displace the air which, for example, is present in the female elements, such that the ductile insulation compound can be provided on the contact element and on the insulation element, in the form of a cup, of the female element or elements. This is particularly necessary for use in a gas-insulated high-voltage switchgear assembly. The plug connection is therefore in the form of a dry plug connection.

If the female element and/or the insulation element in the form of a cup are appropriately matched, an arrangement of a field control electrode, which extends in the direction of the plug connections, or the plug axis, can be provided in the case of the insulating body. In this case, embodiments are also feasible in which the at least one field control electrode is at least partially integrated on or in the insulated body.

In another exemplary embodiment of the present disclosure, the at least one field control electrode can be an insert element which is inserted into the insulation element, which is in the form of a cup, and/or can be inserted into the cylindrical insulation element before the first GIS module is connected to the second GIS module.

The advantages and effects mentioned in conjunction with the GIS modules apply in the same sense to a gas-insulated switchgear assembly having at least two GIS modules which make contact with one another via a plug connection.

FIG. 1 shows a longitudinal section through a first two three-phase-encapsulated HV-GIS modules in the uncoupled state in accordance with an exemplary embodiment of the present disclosure. The longitudinal section through a first embodiment of two three-phase-encapsulated HV GIS modules in the uncoupled state in FIG. 1 illustrates, for example, a first GIS module 1 which can be connected to a second module 2. The first module 1 is, for example, a voltage converter, while the second module 2, which is shown only in its connection area, represents, for example, a connection module in a gas-insulated switch panel. Both modules have a respective housing 3, 4. The housing 4 includes three nominal conductor sections (phase conductors) 5, 6, 7, which extend in the X direction. The housing 3 likewise includes three corresponding nominal conductor connections (phase conductors) 8, 9, 10, which are connected to corresponding instrument transformers 11. The phase conductors 5, 6, 7 of the first module can be electrically connected to the phase conductors 8, 9, 10 of the second module 2, in each case via one plug connection 12 per phase. The electrical connection of the phase conductors 5, 6, 7 of the first module to the phase conductors 8, 9, 10 of the second module 2 is made exclusively via the plug connections 12. In the embodiment of the modules 1, 2 shown in FIG. 1, all the phase conductors each have a female element 13 at the end. In one basic variant, an insulating section of the female element 13 is manufactured from cast resin, while a conductive, metallic plug socket 41 is used as a nominal conductor connection for the female element 13. Depending on the specifications, it is, however, also possible to use suitable materials other than cast resin for this purpose. The respective two female elements 13 for one phase, for example R, Y, B, are electrically connected to one another via a conductive contact element 14 during the fitting of the two modules 1, 2.

FIG. 1 also shows the first module 1 and the second module 2 adjacent to one another while they are being fitted.

As is evident from the positions of the contact element 14 shown in FIG. 1, the contact element 14 is associated either with the first module (phase on the extreme left), no module (phase in the center) or the second module (phase on the extreme right), depending on the fitting specifications, during the fitting process. In practice, a uniform association of the contact elements 14 for all three phases is, however, recommended.

The housings 3, 4 each bound a gas area 15, 16 of each module 1, 2 and each open in a housing-side connecting opening 17, 18 for each phase conductor, which connecting opening 17, 18 surrounds the respective phase conductor and opens in a flange-like adapter section 19, 20.

The two flange-like adapter sections 19, 20 can be mechanically connected to one another, for example via a screw connection 22, which is illustrated in simplified form.

The flange-side seal of the gas areas 15, 16 is produced via insulation sections of the female elements 13 which, during operation, at the same time ensure the electrical isolation between the phase conductor and earth—such as housings 3, 4.

FIG. 1 also shows the female elements 13 are all arranged within a contour line which extends on a second plane 33. For example, in conjunction with FIG. 3, it can be seen that the second plane 33 can at best be used as a holding area for temporary storage of the GIS module, for example during assembly. Furthermore, in this variant, the primary conductor connections and plug contact parts are relatively well protected against external disturbance influences, such as impacts and the like.

Figure 2:
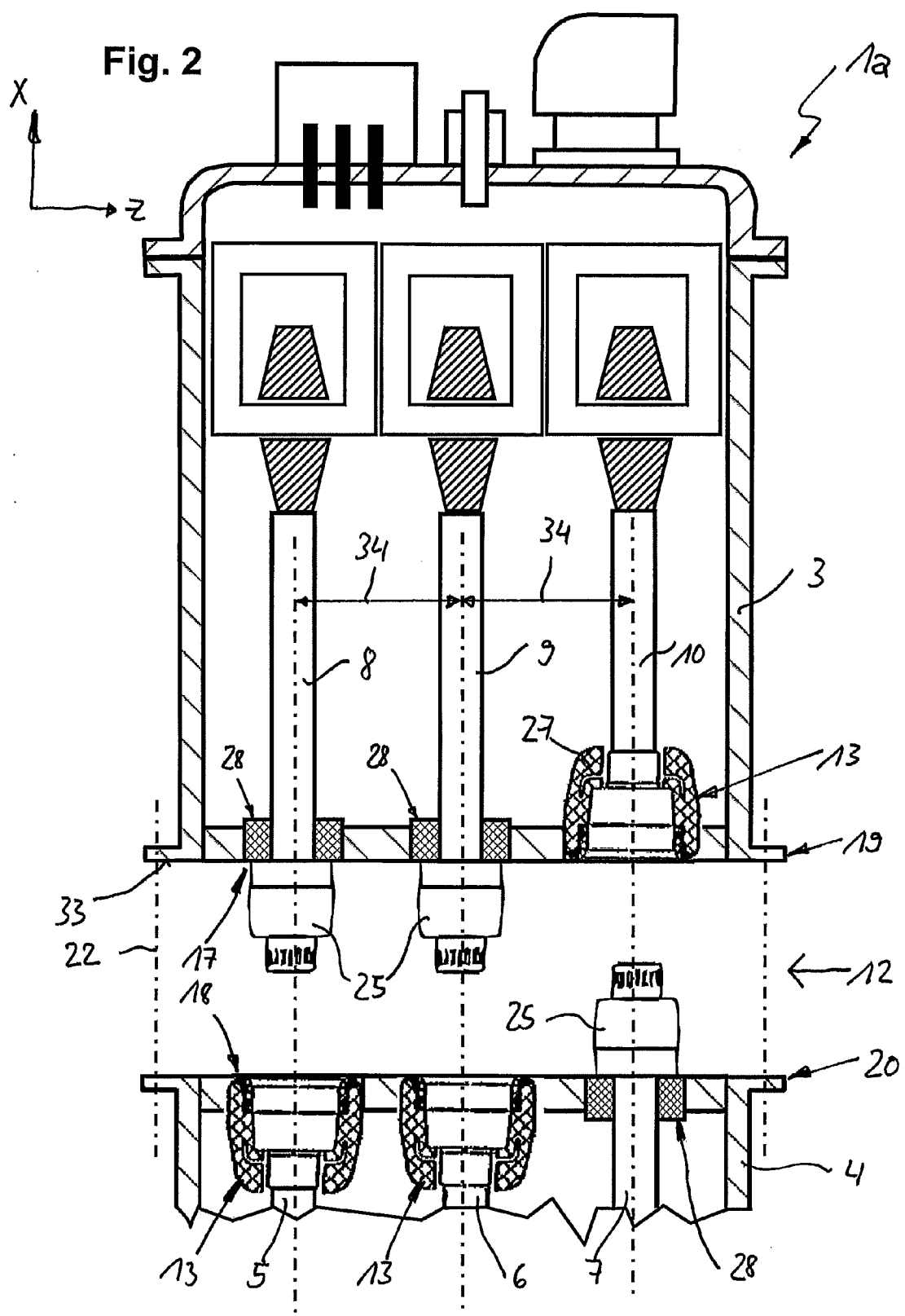
FIG. 2 shows a longitudinal section through a second two three-phase-encapsulated HV GIS modules in the uncoupled state in accordance with an exemplary embodiment of the present disclosure.

FIG. 2 shows a longitudinal section through a second two three-phase-encapsulated HV GIS modules in the uncoupled state in accordance with an exemplary embodiment of the present disclosure. FIG. 2 shows a second embodiment of two three-phase encapsulated HV-GIS modules in the uncoupled state, in a similar manner to FIG. 1. Because of this similarity, only the differences from FIG. 1 will be described in the following text. Identical elements or elements having the same effect are provided with the same reference symbols. The flange-like adapter sections 19, 20 of the housings 3, 4 of the modules 1a, 2a once again in each case have a housing-side connecting opening 17, 18 for each phase, in the connecting area of the respective modules. Instead of the female elements 13, two phase connections of the first module, as part of the respective plug connections 12, now have a contact pin 25 as a male part, as well as a contact socket as a female contact element. In a corresponding manner, two phase connections of the second module, as part of the respective plug connections 12, have a contact socket as a female contact element, as well as a contact pin 25 as a male part of the contact element, for each phase.

It is self-evident that the differently shaped elements 13, 25 specify different insulators for electrical isolation of the primary parts from earth (housing). The insulation body 26, which is formed from a plurality of parts, has one insulation element 27 in the form of a cup for each phase, while the contact pin 25 of the phase conductor 8, 7 has only one insulation sleeve 28, for example, in one basic embodiment. Both the insulation element 27 in the form of a cup and the insulation sleeve 28 form gas-tight, fixed connections of the electrical insulator for the respective housing 3, 4 in the area of the flange-like adapter sections 19, 20. In other words, the insulation sleeve 28 and the insulation element 27 in the form of a cup together form the insulation body 26 of the first module 1.

As shown in FIG. 2, the three phase conductors, which are illustrated in a simplified form in places just as a dashed-dotted line and extend in the X direction, extend at right angles to the second plane 33, which is formed by the contact surface of the flange-like adapter sections. In this case, the housing-side connecting openings 17, 18 are arranged at a regular distance 34 from one another.

FIG. 2 illustrates the coding capability and the fitting position predetermined thereby for the first module 1a on the second module 2a.

FIG. 3 shows a three-dimensional view of a third two three-phase-encapsulated HV GIS modules in the uncoupled state in accordance with an exemplary embodiment of the present disclosure. The three-dimensional view, as shown in FIG. 3, of a third embodiment of two three-phase-encapsulated HV GIS modules in the uncoupled state differs from the first embodiment in the different attachment of the female elements 13. Because of this similarity, only the differences from FIG. 1 will be described in the following text. Identical elements and elements having the same effect are once again provided with the same reference symbols.

FIG. 4 shows a broken-open longitudinal cross section of a first variant of the plug connection, in the coupled state, along the section plane IV-IV in FIG. 3 in accordance with an exemplary embodiment of the present disclosure. As shown in FIG. 4, plug connections of the female elements 13 are held by means of a detachable securing device, for example a clamping ring 30 in the adapter area of the flange-like adapter section or, tubular wall section in the tubular housing section 32, a main chamber 31 of the gas area 15, 16 with the flange-like adapter section 19, 20. When the first module is being removed from a switch panel of a substation, the nominal contact connection can be removed through a service cover of the housing 3, which is not shown in FIG. 3 and has already been removed. In this case, the clamping ring 30 is lifted out of its groove in the female element 13, and the female or male plug contact part 13 of the detachable plug connection 12 is then removed via the gas area 15 of the first module 1b. In this embodiment, the female element 13 is formed at least partially as a clamping flange 23 at its end facing the flange-like adapter section 19. In a corresponding manner, the housing wall and/or the flange-like adapter section has a holding contour in the area of the housing-side connecting opening 17, for example with a complementary shape, in order to hold the clamping flange 23.

The nominal contact connection is fitted and remade in the opposite sequence.

As can also be seen from FIG. 3, the three phase conductors, which are illustrated in a simplified form in places merely as a dashed-dotted line and extend in the X direction, are arranged on a first plane 24. This first plane 24 extends at right angles to the second plane 33, in the Z direction and in the X direction, while the second plane 33 is formed by the contact surface of the flange-like adapter sections. In this case, the housing-side connecting openings 17, 18 are arranged at a regular distance 34 from one another along a straight line 29 which runs at right angles to the mating direction X.

Figure 5:
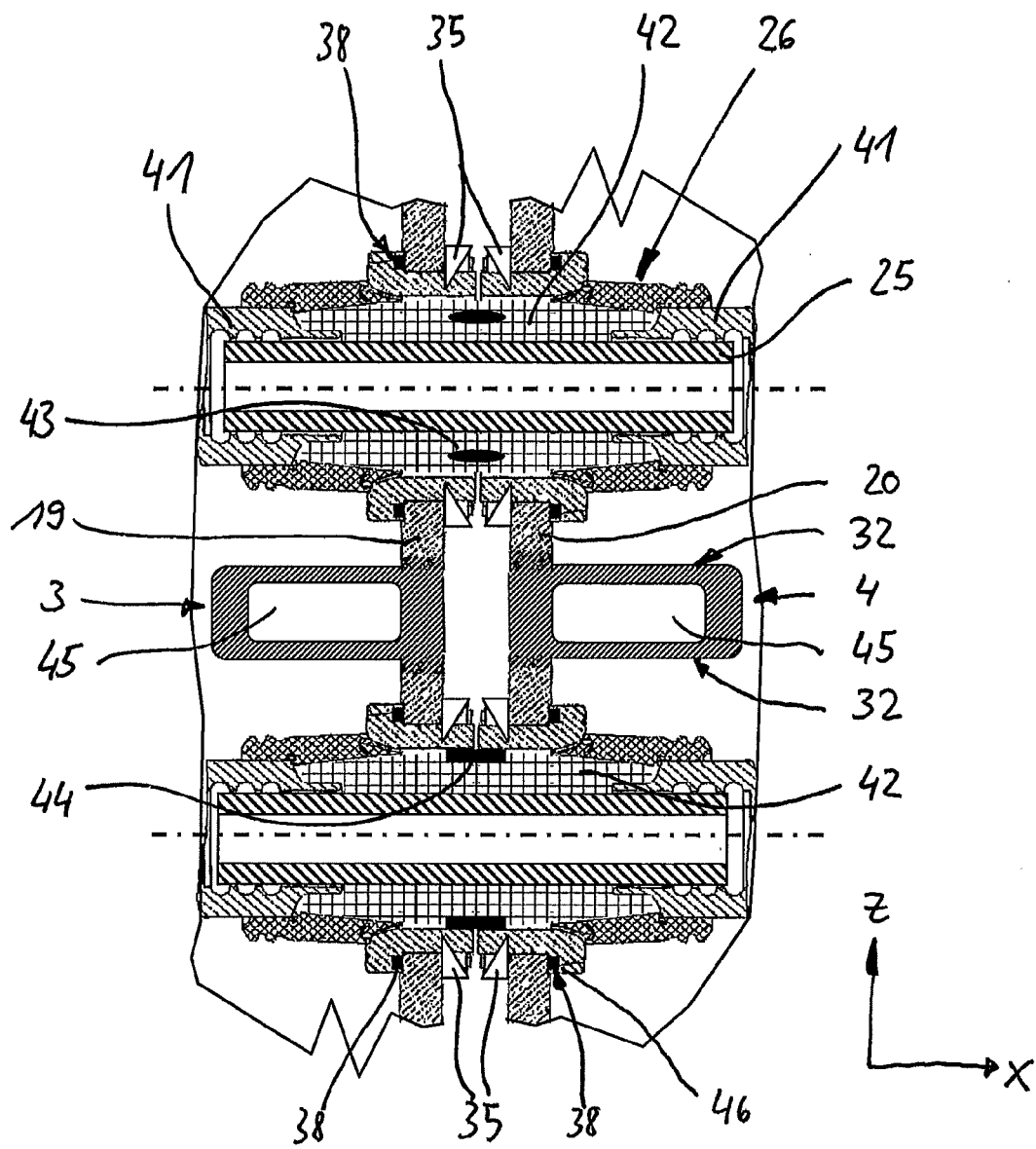
FIG. 5 shows a broken-open longitudinal cross section of a second variant of the plug connection, in the coupled state, along the section plane IV-IV in FIG. 3 in accordance with an exemplary embodiment of the present disclosure.
Figure 6:
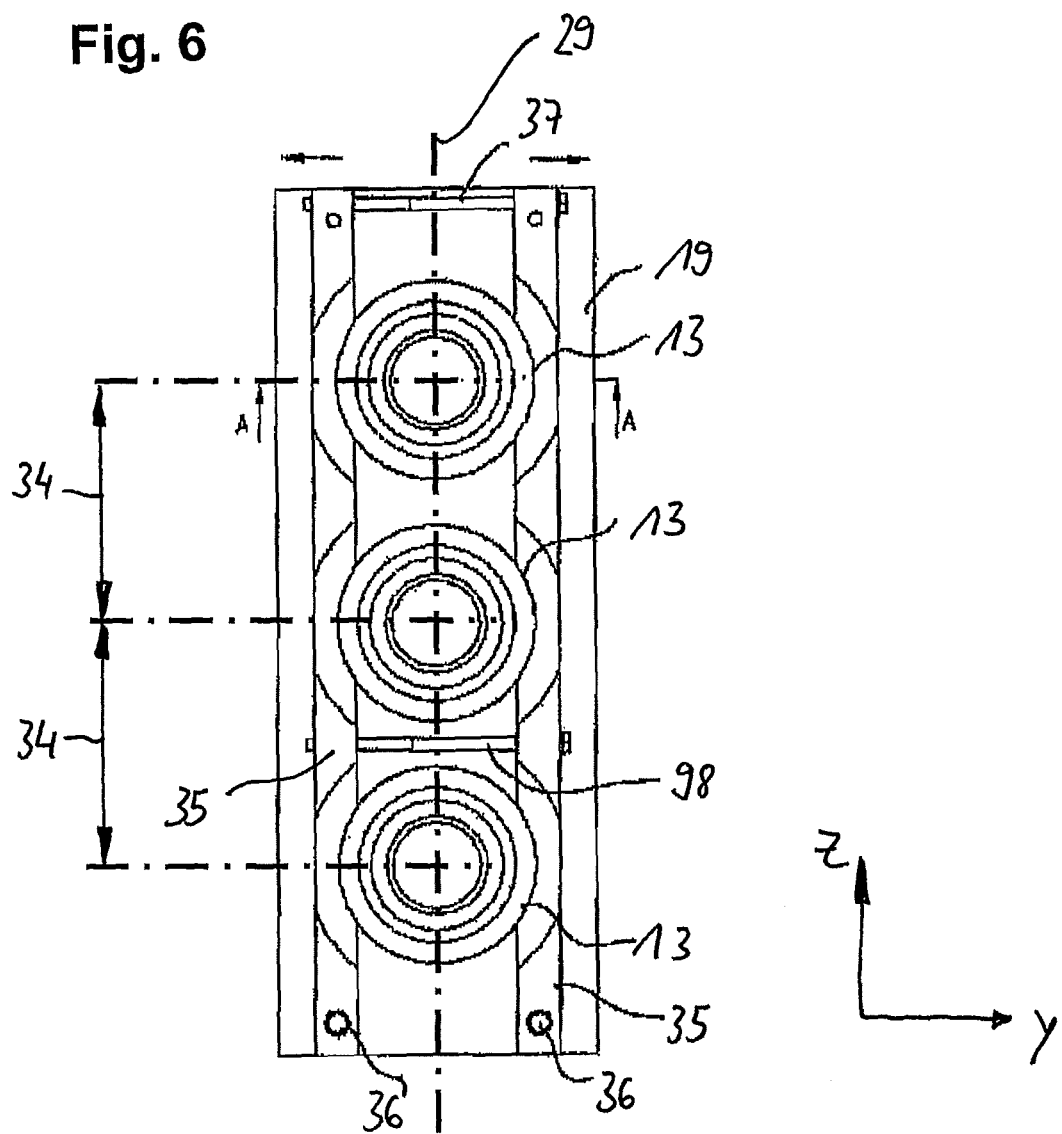
FIG. 6 shows a view of the flange-like adapter section, as shown in FIG. 5, of the first module in the direction X, corresponding to the arrows VI-VI in accordance with an exemplary embodiment of the present disclosure.

A second variant of the plug connection is evident from FIG. 3 in conjunction with FIG. 5 and FIG. 6.

FIG. 5 shows a broken-open longitudinal cross section of a second variant of the plug connection, in the coupled state, along the section plane IV-IV in FIG. 3 in accordance with an exemplary embodiment of the present disclosure.

FIG. 6 shows a view of the flange-like adapter section, as shown in FIG. 5, of the first module in the direction X, corresponding to the arrows VI-VI in accordance with an exemplary embodiment of the present disclosure.

FIG. 6 corresponds to a view of the module 1 corresponding to the section line VI-VI shown in FIG. 3. Because of the similarity of the embodiments, only the differences from FIG. 4 will be described in the following text. Identical elements or elements having the same effect are once again provided with the same reference symbols.

The attachments of three female elements 13, which are arranged alongside one another or, here, one above the other on a straight line 29 and are in the form of plug sockets are shown (see also FIG. 3). In this case, the female elements 13 each engage in housing-side connecting openings 17 which are formed in the housing, from the inside of the housing, that is to say through the gas area 15.

Each of the female elements 13 is in this case provided with a groove, which is arranged uniformly on the circumference but is not shown in any more detail, at its end which is similar to a flange and faces the connecting opening 17, in which groove clamping wedges 35 which are arranged diametrically opposite one another in each case engage. The clamping wedges 35 are in the form of rods, and act on all three female elements 13. At their lower ends shown in FIG. 6, they are each articulated on the housing wall, or the flange-like adapter section 19, at articulation points 36, while the upper ends of the clamping wedges 35 are loaded towards one another by means of at least one tension rod 37. A further tension rod is also arranged in the illustration shown in FIG. 6, in addition to the tension rod 37 arranged at the outermost upper end of the clamping wedges 35. The clamping wedges 35, which are in the form of rods and are acted on in this way, ensure in a comparatively simple manner that the female elements 13 are attached for the respective connecting opening 17 of the flange-like adapter section.

At least one seal 38 is inserted at a boundary surface between the end of the female elements 13 which is similar to a flange and the housing wall 19 surrounding the connecting opening 17, ensuring the specified gas-tightness for this connection.

The female elements 13 are attached such that, once the female elements 13 have been inserted into the connecting openings 17 provided, the respectively associated clamping wedges 35 which are in the form of rods and are arranged on the housing wall such that they can pivot engage in the holding groove, which is formed at that end of each associated female element 13 which is similar to a flange, and are braced by means of the at least one tension rod 37 such that each female element 13 is fixed immovably and in a gas-tight manner in the housing 3.

FIG. 5 shows the attachment of the three female elements 13 in a further embodiment of the plug connection 12, in a similar position to that shown in FIG. 4, in the form of a longitudinal section through the housing wall of the housing, for two flange-like adapter sections. As can be seen from the section through the housing wall with a flange-like adapter section, the housing wall is partially drawn in between two adjacent connecting openings 17, between the housing sections 32 which are similar to tubes, such that a window 45 is created in the housings 3, 4. This constriction is used to keep the volume of the gas areas 15, 16 as small as possible.

This illustration shows on the one hand the position of the seal 38, which is inserted between the flange-like adapter section 19 and the female element 13, and on the other hand the method of operation of the clamping wedges 35 which, because of the incline of the clamping wedges 35, interact with an incline which is formed in the corresponding annular groove 46. This means that the further the clamping wedges 35 are loaded towards one another by stressing of the tension rod 37, the greater the effect is of a force which acts transversely with respect thereto, extends in the x direction, which the female elements 13 bear against the sealing surface internally on the flange-like adapter section 19, such that the seal 38 is acted on correspondingly outwards.

As can also be seen from FIG. 5, the conductor connections 40, which are in the form of sockets, in the female elements 13 of a plug connection are electrically connected to one another via the contact element 14, which is in the form of a sleeve. Furthermore, FIG. 5 illustrates how the conductor connections 40, which are in the form of sockets, are connected via the insulation element 27, which is in the form of a cup, to a plug socket 41 which is used for positioning the female element 13 in the connecting openings 17. The electrical insulation of the conductor connections 40, in the form of sockets, and of the contact element 14, in the form of a sleeve, from the plug socket 41 and from the housing 3, which is at earth potential, is provided via a silicone collar 42 in the form of a sleeve.

In the upper embodiment of the plug connection 12 shown in FIG. 5, a first field control electrode 43 is integrated in the silicone collar 42. In contrast to this, in the lower embodiment of the plug connection 12 shown in FIG. 5, a second field control electrode 44 has been inserted in a holding opening in the silicone collar 42 while the latter was being fitted.

A third variant of the plug connection is evident from FIG. 3 in conjunction with FIG. 7 and FIG. 8. Only the differences between FIGS. 5 and 6 will be described in the following text, owing to the similarity to the second variant of the plug connection. Identical elements and elements having the same effect are once again provided with the same reference symbols.

FIG. 7 shows a broken-open longitudinal cross section of a third variant of the plug connection, in the coupled state, along the section plane IV-IV in FIG. 3 in accordance with an exemplary embodiment of the present disclosure.

FIG. 8 shows a view of the flange-like adapter section, as shown in FIG. 7, of the first module in the direction X, corresponding to the arrows VI-VI in accordance with an exemplary embodiment of the present disclosure.

In a similar manner to that in FIGS. 5 and 6, FIGS. 7 and 8 show two of the three female elements 13, which are arranged alongside one another or in this case one above the other on a straight line 29, on the flange-like adapter section 19 of the first module. In this case, the female elements 13 each engage in housing-side connecting openings 17 formed in the housing, from the inside of the housing, that is to say through the gas area 15. In this case, each of the female elements 13 is provided at its end, which is similar to a flange and faces the connecting opening 17, with a groove 46, which is arranged uniformly on the circumference, is not shown in any more detail, and in which clamping wedges 35 which are arranged diametrically opposite one another in each case engage. The clamping wedges 35 are in the form of rods and are each alternately articulated at one end on the housing wall, at articulation points 36. In this case alternately means that the articulation points 36 of the clamping wedges 35 are arranged such that they alternate on one side and then the opposite side of the straight line 29, seen in the mating direction X. The other end of each clamping wedge 35 which is in the form of a rod is in each case provided with a through-hole, through which a threaded rod 47 passes. By means of appropriately positioned threaded nuts 48, the threaded rod 47 provides the clamping bracing for the associated clamping wedges 35, which are in the form of rods and are acted on thereby, and thus the attachment of the female elements 13.

At least one seal 38 is inserted at the boundary surface between that end of the female element 13 which is similar to a flange and the housing wall, which surrounds the housing-side connecting opening 17, of the flange-like adapter section 19, which seal 38 ensures the specified gas-tightness of this plug contact connection.

The female elements 13 are in this case attached such that, after insertion of the female elements 13 into the housing-side connecting openings 17 that are provided, the respectively associated clamping wedges 35, which are in the form of rods and are arranged such that they can pivot on the housing wall of the flange-like adapter section 19, engage in the holding groove 46, which is formed at the end, which is similar to a flange, of the associated female elements 13, and are braced by means of the adjusting nuts 48, which are provided on the respective tie rod 47, which is in the form of a threaded rod, such that each female element 13 is fixed immovably and in a gas-tight manner in the housing 3.

FIG. 8 shows the attachment of a single one of the three female elements 13 in the form of a longitudinal section through the housing wall of the flange-like adapter section 19. This illustration shows, on the one hand, the position of the seal 38 which is inserted between the housing wall of the flange-like adapter section 19 and the female element 13 and, on the other hand, the method of operation of the clamping wedges 35 which, because of the incline of the clamping wedges 35, interact with an incline which is formed in the corresponding annular groove 46. This means that the further the clamping wedges 35 are loaded towards one another by bracing of the adjusting nuts 48, the greater is the effect of a force which acts transversely with respect thereto, in the X direction, forcing the female elements 13 against the sealing surface, and therefore outwards against the seal 38.

A fourth variant of the plug connection is evident from FIG. 3 in conjunction with FIG. 9 and FIG. 10. Only the differences from FIGS. 5 and 6 will be described in the following text, because of the similarity to the second variant of the plug connection. Identical elements or elements having the same effect are once again provided with the same reference symbols.

FIG. 9 shows a broken-open longitudinal cross section of a fourth variant of the plug connection, in the coupled state, along the section plane IV-IV in FIG. 3 in accordance with an exemplary embodiment of the present disclosure.

FIG. 10 shows a view of the flange-like adapter section, as shown in FIG. 9, of the first module in the direction X, corresponding to the arrows VI-VI in accordance with an exemplary embodiment of the present disclosure.

FIGS. 9 and 10 show the attachment of three female elements 13, which are arranged alongside one another, or in this case one above the other, on a straight line 29, wherein the female elements 13 each engage in housing-side connecting openings 17, which are formed in the housing, from the inside of the housing 3, that is to say from the gas area 15.

In this case, each of the female elements 13 is provided at its end, which is similar to a flange and faces the housing-side connecting openings 17, with a groove 46 which is arranged uniformly on the circumference, is not shown in any more detail, and in which clamping wedges 35, which are arranged diametrically opposite one another with respect to the mating axis X, in each case engage. The clamping wedges 35 are in the form of rods and are arranged on both sides of the female elements 13, which are arranged at a regular distance 34 along the straight line 29.

Holding elements 49 are provided in each case above and below the female elements 13 for each clamping wedge 35 in the form of a rod and act on the clamping wedges 35 laterally in the direction of the mating direction X of the female elements 13, thus producing the clamping bracing of the associated clamping wedges 35 acted on by them, and therefore the attachment of the female elements 13. Tie rods 50, which support the holding force by means of clamping nuts 48, are in each case shown at the upper end, as shown in FIG. 10.

At least one seal 38 is inserted at the boundary surface between the end, which is similar to a flange, of the female element 13 and the housing wall, which surrounds the housing-side connecting openings 17, which seal 38 ensures the specified gas-tightness of this plug connection with respect to the housing 3.

The female elements 13 are attached such that, after insertion of the female elements 13 into the housing-side connecting openings 17 that are provided, the respectively associated clamping wedges 35, which are guided on the housing wall, engage in the holding groove 46, which is formed at that end of the associated female elements 13 which is similar to a flange, and are braced by means of the adjusting nuts 48, which are provided on the respective tie rod 50, which is in the form of a threaded rod, such that each female element 13 is fixed immovably and in a gas-tight manner in the housing 3.

FIG. 10 illustrates the attachment of an individual one of the three female elements 13, in the form of a longitudinal section through the housing wall, in the case of the flange-like adapter section. This illustration shows on the one hand the position of the seal 38, which is inserted between the housing wall and the female elements 13, and on the other hand the method of operation of the clamping wedges 35 which, because of the incline of the clamping wedges 105, interact with an incline which is formed in the corresponding annular groove 46. This means that, the further the clamping wedges 35 are loaded towards one another by the bracing of the adjusting nuts 48, the greater is the effect of a force which acts transversely with respect thereto in the direction of the mating axis X. This force forces the female elements 13 against the sealing surface, and therefore outwards against the seal 38.

Figure 11:
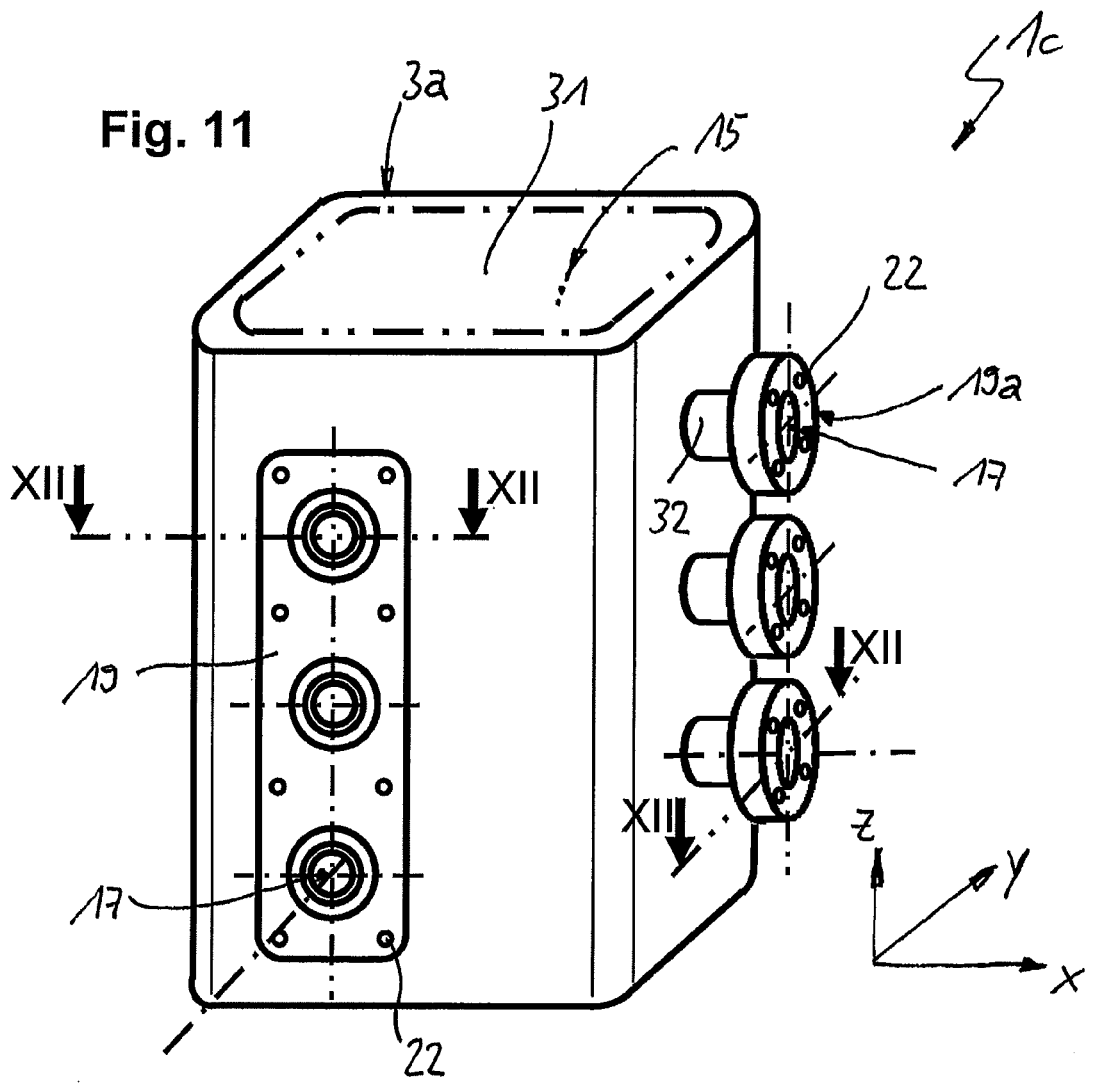
FIG. 11 shows a three-dimensional view of an alternative HV-GIS module in the uncoupled state in accordance with an exemplary embodiment of the present disclosure.

FIG. 11 shows a three-dimensional view of an alternative HV-GIS module in the uncoupled state in accordance with an exemplary embodiment of the present disclosure. FIG. 11 will be used to show that the present disclosure is not just restricted to phase conductors which extend along a single axis x in the gas area, but that angled outgoers are also possible in the gas area, in such a way that a first group of plug connections is positioned at an angle to a second group of plug connections. The flange-like adapter section 19, which is aligned on the XZ plane, extends at right angles to the further flange-like adapter section 19a, which is aligned on the YZ plane, and is largely integrated in the housing wall of the main chamber 31. In a similar manner to that shown in FIG. 3, the main chamber 31 of the gas area 15 is connected via tube-like housing sections 32 to the housing-side connecting openings 17 in the further flange-like adapter section 19a. In contrast to the housing 3 shown in FIG. 3, the housing 3a has three separate flange-like adapter sections 19a for each conductor phase, however.

An exemplary embodiment of the present disclosure including a GIS module which, for the purposes of the present disclosure, can be used both as a first module and as a second module, contributes to the capability to use the GIS modules in a versatile, modular form, particularly for high-voltage applications.

Figure 12:
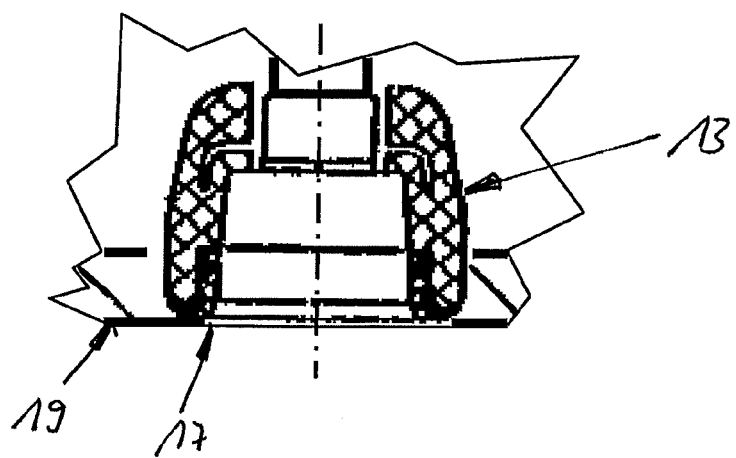
FIG. 12 shows a local cross-section, illustrated in simplified form, of the module in FIG. 11 along the section plane XII-XII in FIG. 11 in accordance with an exemplary embodiment of the present disclosure.

FIG. 12 shows a local cross-section, illustrated in simplified form, of the module in FIG. 11 along the section plane XII-XII in FIG. 11 in accordance with an exemplary embodiment of the present disclosure. As is evident from FIG. 12 in conjunction with FIG. 11, a female contact part of the plug connection in the form of the female element 13 can be used, for example, for both embodiments of the flange-like adapter sections 19, 19a.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 1, 1a, 1b, 1c First module
2, 2a, 2b Second module
3 Housing of the first module
4 Housing of the second module
5, 6, 7 Phase conductors of the first module
8, 9, 10 Phase conductors of the second module
11 Instrument transformer
12 Plug connection
13 Female element
14 Contact element
15 Gas area in the first module
16 Gas area in the second module
17, 18 Housing-side connecting openings
19 Flange-like adapter section of the 1st module
20 Flange-like adapter section of the 2nd module
22 Screw connection
23 Clamping flange
24 First plane
25 Contact pin
26 Insulation body
27 Insulation element in the form of a cup
28 Insulation sleeve
29 Straight line
30 Clamping ring
31 Main chamber
32 Housing section
33 Second plane
34 Distance
35 Clamping wedge
36 Articulation point
37 Tension rod
38 Seal
40 Female conductor connection
41 Female connector
42 Silicone collar
43 First field control electrode
44 Second field control electrode
45 Window
46 Annular groove
47 Threaded rod
48 Threaded nut
49 Holding element
50 Tie rod

What is claimed is:

1. A gas-insulated high-voltage switchgear assembly comprising:
a first module and a second module,
wherein the modules each have a gas area, which is in the form of a pressure vessel and has at least two phase conductors,
wherein the gas area is in each case filled with an insulating gas such that the at least two phase conductors are arranged in an electrically isolated manner in the respective module, and
wherein the first module is connected to the second module such that the first gas area and the second gas area are hydraulically isolated from one another,
wherein the phase conductors in the first module are electrically connected during operation of the high-voltage switchgear assembly to the phase conductors at the same electrical potential in the second module,
wherein the two gas areas each have a housing-side connecting opening for each phase conductor, which connecting opening surrounds the respective phase conductor and opens into a flange-like adapter section,
wherein the flange-like adapter section of the first module can be mechanically detachably connected to the flange-like adapter section of the second module, wherein each of the at least two phase conductors in the first module can be electrically connected to the corresponding phase conductor at the same electrical potential in the second module, in each case via a detachable plug connection, wherein each plug connection has an insulating body, which comprises:
    at least one female insulation element;
    an insulation section which, during operation, interacts with the female insulation element, thereby forming a seal; and
    a conductive plug socket forming a conductor connection for the female insulation element, wherein each plug connection further has a conductive contact element with at least one contact pin as a male part of the contact element.

2. The gas-insulated high-voltage switchgear assembly according to claim 1, wherein the gas areas of the modules are pressure vessels which are designed for operation of the high-voltage switchgear assembly at a nominal pressure of at least 2 bar in the respective gas area.

3. The gas-insulated high-voltage switchgear assembly according to claim 1, wherein the flange-like adapter sections of at least two connecting openings of the same module are each at least partially integrated in a common adapter section.

4. The gas-insulated high-voltage switchgear assembly according to claim 1, wherein the adapter sections of at least two connecting openings of the same module are each at least partially integrated in a housing-side wall section of the respective module.

5. The gas-insulated high-voltage switchgear assembly according to claim 1, wherein the first module and the second module each have at least three phase conductors, and in that the at least three detachable plug connections are arranged at a regular distance from one another.

6. The gas-insulated high-voltage switchgear assembly according to claim 1, wherein at least one detachable plug connection has a first female insulation element and a second female insulation element, which are electrically connected to one another via the contact element, which extends between the female elements, wherein the first female insulation element is attached to the adapter section of the first module, and the second female insulation element is attached to the adapter section of the second module.

7. The gas-insulated high-voltage switchgear assembly according to claim 1, wherein the at least one female insulation element is attached to the adapter section of the first module, and the contact pin is attached to the adapter section of the second module.

8. The gas-insulated high-voltage switchgear assembly according to claim 1, wherein the adapter sections of the first module and the adapter sections of the second module are connected to one another to mechanically connect each of the two modules, by means of at least one screw connection.

9. The gas-insulated high-voltage switchgear assembly according to claim 1, wherein the adapter sections of the first module and the adapter sections of the second module can be connected to one another in order to mechanically connect each of the two modules by means of at least one clamping connection, which circumferentially surrounds the adapter sections, at least in places.

10. The gas-insulated high-voltage switchgear assembly according to claim 1, wherein the insulation section is a cylindrical insulation element, which interacts, forming a seal, with the female insulation element which is in the form of a cup.

11. The gas-insulated high-voltage switchgear assembly according to claim 10, wherein at least one field control electrode is arranged close to the insulating body and extends in the direction of the plug connections.

12. The gas-insulated high-voltage switchgear assembly according to claim 11, wherein the at least one field control electrode is at least partially integrated on or in the insulating body.

13. The gas-insulated high-voltage switchgear assembly according to claim 11, wherein the at least one field control electrode is in the form of an insert element which is inserted into the female insulation element, which is in the form of a cup, and/or can be inserted into the cylindrical insulation section before the first module is connected to the second module.

14. The gas-insulated high-voltage switchgear assembly according to claim 10, wherein the at least one female insulation element, which is in the form of a cup, and the cylindrical insulation section comprise different insulation materials, such as cast resin and silicone, respectively.

15. A gas-insulated high-voltage switchgear assembly comprising:
    a first module having a first gas area filled with an insulating gas and at least two phase conductors electrically isolated through the insulating gas in the first gas area; and
    a second module having a second gas area filled with insulating gas area and at least two phase conductors electrically isolated through the insulating gas in the second gas area,
    wherein the first module is connected to the second module such that the first gas area and the second gas area are hydraulically isolated from one another,
    wherein the phase conductors in the first module are electrically connected during operation of the high-voltage switchgear assembly to the phase conductors at the same electrical potential in the second module,
    wherein the first and second gas areas each have a housing-side connecting opening for each phase conductor, which connecting opening surrounds the respective phase conductor and opens into a flange-like adapter section,
    wherein the flange-like adapter section of the first module can be mechanically detachably connected to the flange-like adapter section of the second module,
    wherein each of the at least two phase conductors in the first module can be electrically connected to the corresponding phase conductor at the same electrical potential in the second module, in each case via a detachable plug connection,
    wherein each plug connection has an insulating body, which comprises:
        at least one female insulation element;
        an insulation section which, during operation, interacts with the female insulation element, thereby forming a seal; and
        a conductive plug socket forming a conductor connection for the female insulation element,
    wherein each plug connection has a conductive contact element with at least one contact pin as a male part of the contact element.

* * * * *